(12) United States Patent
Usui

(10) Patent No.: US 7,088,069 B2
(45) Date of Patent: Aug. 8, 2006

(54) LOAD MONITORING METHOD FOR MOTOR-DRIVEN INJECTION MOLDING MACHINE

(75) Inventor: Kazuo Usui, Nagano (JP)

(73) Assignee: Nissei Plastic Industrial Co., Ltd., Nagano-Ken (JP)

(*) Notice: Subject to any disclaimer, the term of this patent is extended or adjusted under 35 U.S.C. 154(b) by 98 days.

(21) Appl. No.: 10/701,570

(22) Filed: Nov. 6, 2003

(65) Prior Publication Data

US 2004/0090202 A1 May 13, 2004

(30) Foreign Application Priority Data

Nov. 7, 2002 (JP) .............................. 2002-323232

(51) Int. Cl.
*G05B 5/00* (2006.01)

(52) U.S. Cl. ..................... 318/474; 318/801; 318/812; 264/40.1; 264/40.5; 264/328.1; 425/135; 425/136; 425/145; 425/149; 425/150

(58) Field of Classification Search ............... 318/474, 318/801–812; 264/40.1; 425/135, 136, 425/145, 149, 150

See application file for complete search history.

(56) References Cited

U.S. PATENT DOCUMENTS

| | | | | |
|---|---|---|---|---|
| 4,837,490 A | * | 6/1989 | Neko | 318/568.1 |
| 4,847,023 A | * | 7/1989 | Neko | 264/40.1 |
| 5,554,326 A | * | 9/1996 | Nakazawa et al. | 264/40.1 |
| 5,772,932 A | * | 6/1998 | Kamiguchi et al. | 264/40.5 |
| 5,792,395 A | * | 8/1998 | Ito et al. | 264/40.1 |
| 5,817,258 A | * | 10/1998 | Ito et al. | 264/40.1 |
| 5,906,777 A | * | 5/1999 | Kamiguchi et al. | 264/40.1 |
| 5,911,924 A | * | 6/1999 | Siegrist et al. | 264/40.1 |
| 6,325,954 B1 | * | 12/2001 | Sasaki et al. | 264/40.1 |
| 6,555,035 B1 | * | 4/2003 | Iimura et al. | 264/40.1 |
| 6,610,225 B1 | * | 8/2003 | Usui et al. | 264/40.1 |
| 6,610,226 B1 | * | 8/2003 | Usui et al. | 264/40.1 |
| 6,833,092 B1 | * | 12/2004 | Usui | 264/40.1 |

FOREIGN PATENT DOCUMENTS

JP    11-235743 A    8/1999

* cited by examiner

*Primary Examiner*—Rina Duda
*Assistant Examiner*—Tyrone Smith
(74) *Attorney, Agent, or Firm*—Birch, Stewart, Kolasch & Birch, LLP

(57) ABSTRACT

Load of each motor-driven drive section of an injection molding machine is monitored in order to obtain an average load level of the drive section for each molding cycle. A cycle extending time or a cycle shortening time necessary for decreasing or increasing the average load level to a previously set reference load level is calculated, and is displayed directly or indirectly.

19 Claims, 5 Drawing Sheets

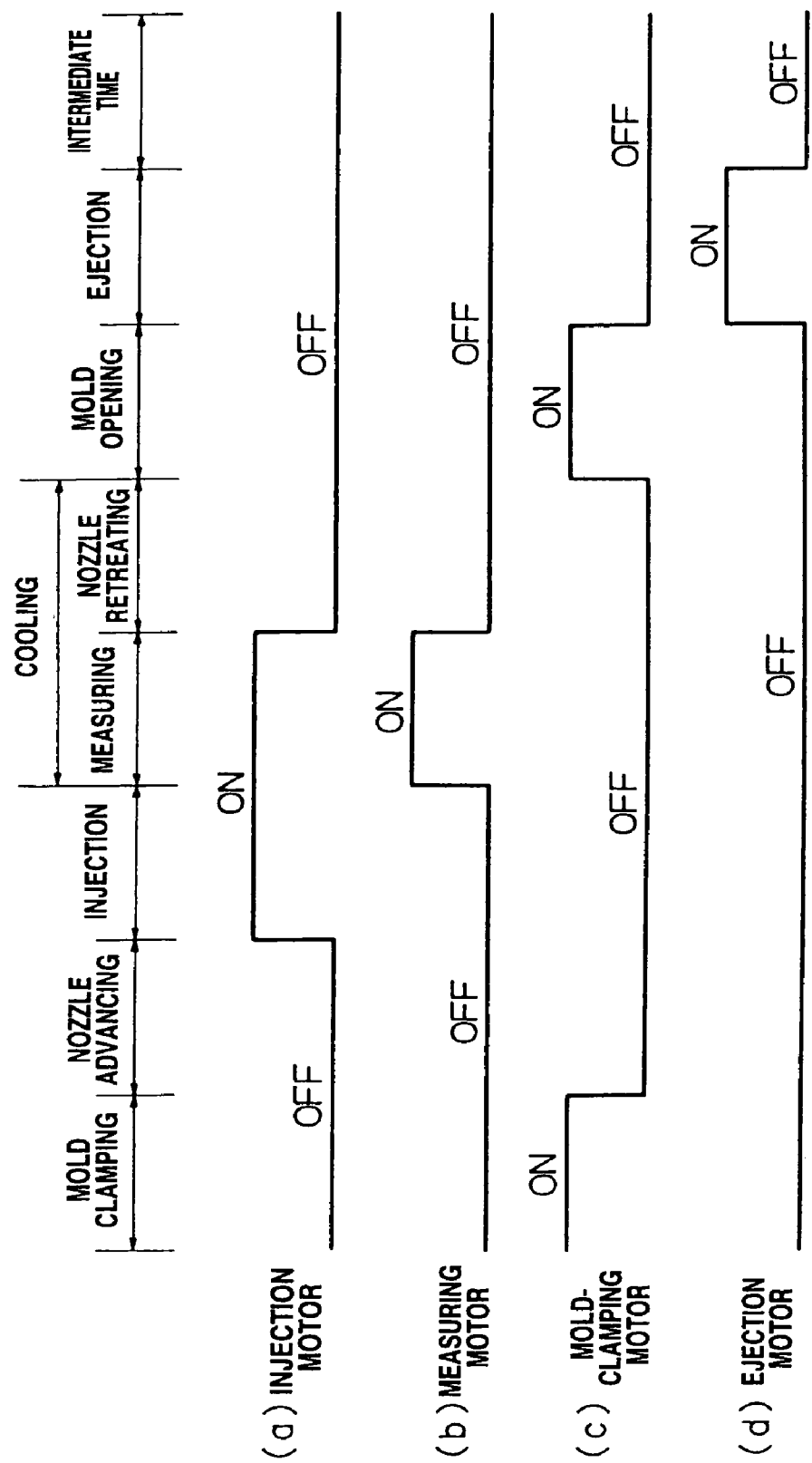

LOAD MONITORING METHOD FOR MOTOR-DRIVEN INJECTION MOLDING MACHINE

This Nonprovisional application claims priority under 35 U.S.C. §119(a) on Patent Application No(s). 2002-323232 filed in JAPAN on Nov. 7, 2002, the entire contents of which are hereby incorporated by reference.

BACKGROUND OF THE INVENTION

1. Field of the Invention

The present invention relates to a load monitoring method for a motor-driven injection molding machine, which monitors load of a drive section using a drive motor (servomotor).

2. Description of the Relevant Art

Generally, a motor-driven injection molding machine using a servomotor at a drive section potentially involves malfunction or breakage of the servomotor due to overheat arising under certain molding conditions or under a certain environment, since the servomotor generates heat according to load current. Therefore, the motor-driven injection molding machine usually employs measures for protection of the servomotor. Specifically, a heat generation quantity of the servomotor is detected. When the detected heat generation quantity (detection value) reaches a preset stopping point, the servomotor is determined to be in an overload state and is forcibly stopped to thereby protect the servomotor.

For a motor-driven injection molding machine, stoppage of a servomotor during molding means interruption of a molding process, which may have an adverse effect on the molding process once resumed; e.g., lowering the operating ratio. Therefore, interruption of a molding process must be avoided to the extent possible. In order to meet this end, for example, Japanese Patent Application Laid-Open (kokai) No. 11(1999)-235743 proposes a method for checking previously set operating conditions. According to the proposed method, the injection molding machine is operated on a trial basis, current flowing through a servomotor is measured along with a time during which the current flows; and when the measured current and time fall within a predetermined overload-danger region set to be lower than a predetermined overload region, an operator is prompted to review the previously set operating conditions. This method avoids a problem such that, because of a relatively small variation in load caused by a disturbance and a variation in temperature of the machine during continuous operation, the actually measured current and time fall within the overload region, and the operation of the machine is interrupted.

The above-mentioned conventional method involves the following problems.

First, as a result of the previously set operating conditions being reviewed in order to provide a margin, a molding cycle may involve wasteful time, possibly lowering production efficiency and productivity. That is, since a molding cycle is typically several seconds to several minutes, a slight amount of wasteful time per molding cycle results in considerable time loss (a decrease in productivity) when the production is considered as a whole.

Second, since operating conditions are reviewed merely at the stage of trial operation, the review fails to reflect operating conditions during actual molding. Thus, the conventional method may fail to accurately set operating conditions, resulting in impaired molding quality.

SUMMARY OF THE INVENTION

An object of the present invention is to provide a load monitoring method for a motor-driven injection molding machine, which method enables an operator to accurately grasp an actual load condition in real time, to thereby enable the operator to quickly take necessary measures; for example, extending a cooling time in order to avoid an interruption of a molding process stemming from overload, or optimizing a cycle time in order to eliminate wasteful time, to thereby improve production efficiency and productivity.

Another object of the present invention is to provide a load monitoring method for a motor-driven injection molding machine, which method enables the operator to set and maintain optimum molding conditions, while reflecting actual operating conditions therein, to thereby improve molding quality.

To achieve the above objects, the present invention provides a method for monitoring load of a motor-driven drive section of a motor-driven injection molding machine, the method comprising the steps of: obtaining an average load level of the drive section for each molding cycle; calculating a cycle extending time or a cycle shortening time which is necessary for decreasing or increasing the average load level to a previously set reference load level; and displaying the cycle extending time or the cycle shortening time, directly or indirectly.

BRIEF DESCRIPTION OF THE DRAWINGS

FIG. 5 is a timing chart showing operation of drive motors provided in the drive section of the motor-driven injection molding machine.

DETAILED DESCRIPTION OF THE PREFERRED EMBODIMENT

An embodiment of the present invention will next be described in detail with reference to the drawings. The accompanying drawings are illustrative of the embodiment and are not meant to limit the scope of the invention. In order to describe the invention clearly, detailed description of known features is omitted.

The configuration of a motor-driven injection molding machine 1 capable of carrying out a load monitoring method according to the present embodiment will be described with reference to FIG. 3.

Figure 3:
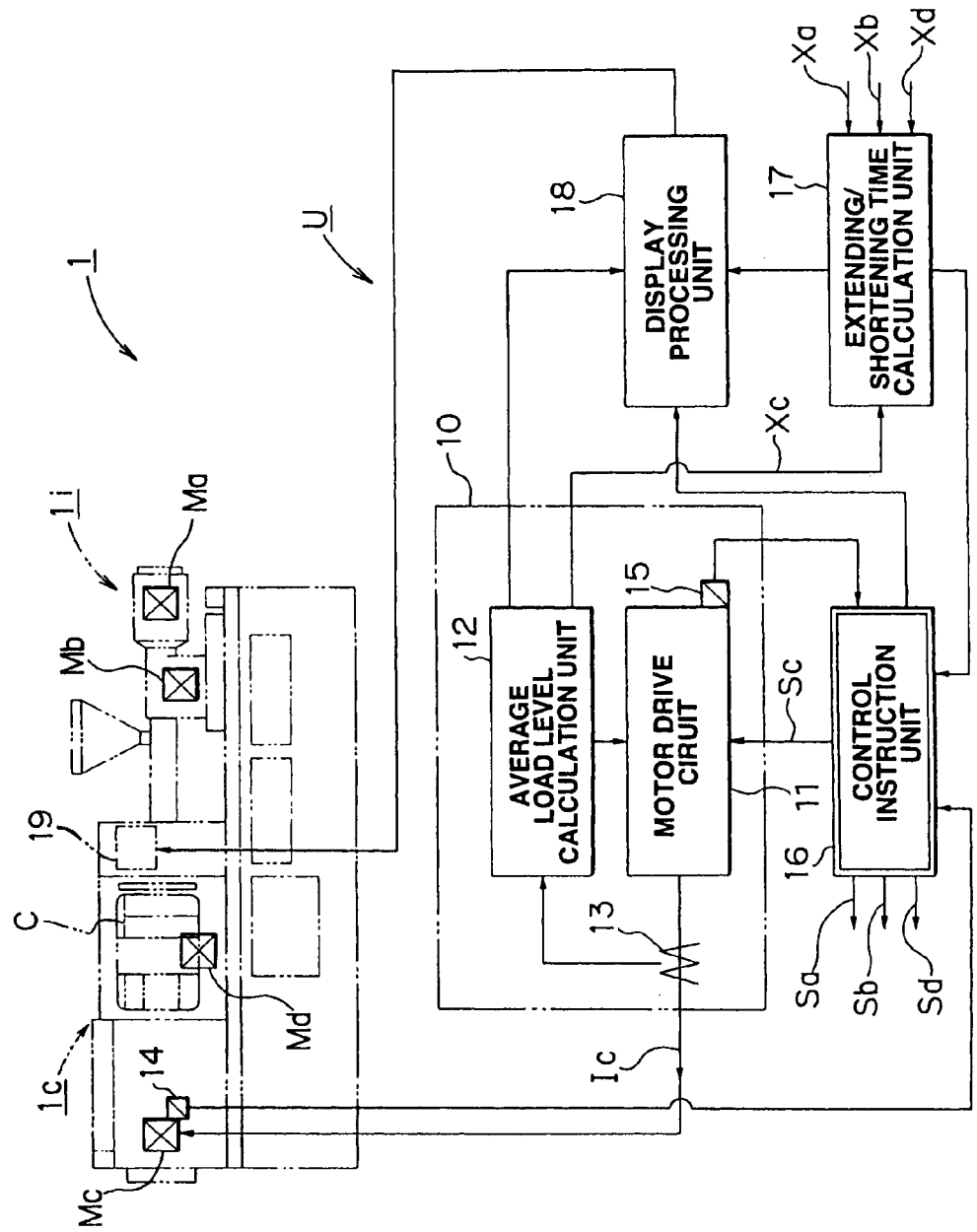
FIG. 3 is a block diagram of the control system of a motor-driven injection molding machine capable of carrying out the load monitoring method.

FIG. 3 schematically shows the motor-driven injection molding machine 1 illustrated by use of imaginary lines, and also shows a control system for controlling a mold-clamping motor Mc, which serves as a drive section of a mold-clamping mechanism installed in a mold-clamping unit 1c for clamping a mold C. Reference numeral 10 denotes a servoamplifier. The servoamplifier 10 includes a motor drive circuit 11 for driving the mold-clamping motor (servomotor) Mc, and a average-load-level calculation unit 12 for obtaining average load level Xc from load current Ic flowing through the mold-clamping motor Mc. In order to detect the magnitude of the load current Ic flowing through the mold-clamping motor Mc, a current sensor 13 is disposed in a connection line connecting the motor drive circuit 11 and the mold-clamping motor Mc.

Meanwhile, a first thermostat 14 is attached to the mold-clamping motor Mc in order to directly detect the temperature of the mold-clamping motor Mc. Upon detection of a preset temperature, the first thermostat 14 outputs an overload detection signal. A second thermostat 15 is attached to the motor drive circuit 11 in order to directly detect the temperature of the motor drive circuit 11. Upon detection of a preset temperature, the second thermostat 15 outputs an overload detection signal. The first thermostat 14 and the second thermostat 15 are connected to a control instruction unit 16.

Reference character U denotes a controller having computer-processing functions. The controller U includes the control instruction unit 16 and an extending/shortening time calculation unit 17, both of which operate under computer-processing functions, as well as a display processing unit 18. The average-load-level calculation unit 12 supplies the average load level Xc to the extending/shortening time calculation unit 17. The extending/shortening time calculation unit 17 supplies a calculation result (time value) to the control instruction unit 16 and the display processing unit 18. The control instruction unit 16 supplies the motor drive circuit 11 with a control signal Sc for controlling the mold-clamping motor Mc. The average-load-level calculation unit 12 is connected to the display processing unit 18 and the motor drive circuit 11. An output terminal of the display processing unit 18 is connected to a display 19.

In addition to having the mold-clamping motor Mc, the motor-driven injection molding machine 1 further includes drive motors in other drive sections; specifically, as shown in FIG. 3, an injection motor (servomotor) Ma for moving forward and backward a screw of an injection unit 1$i$; a measuring motor (servomotor) Mb for rotating the screw of the injection unit 1$i$; and an ejection motor (servomotor) Md for ejecting a molded article from the mold C of the mold-clamping unit 1$c$. As in the case of the mold-clamping motor Mc, the motors Ma, Mb, and Md are connected to respective servoamplifiers 10 similar to the servoamplifier 10 for the mold-clamping motor Mc. Accordingly, average-load-level calculation units 12 of the respective servoamplifiers 10 supply the extending/shortening time calculation unit 17 with an average load level Xa of the injection motor Ma, an average load level Xb of the measuring motor Mb, and an average load level Xd of the ejection motor Md. The control instruction unit 16 supplies motor drive circuits 11 of the respective servoamplifiers 10 with a control signal Sa for controlling the injection motor Ma, a control signal Sb for controlling the measuring motor Mb, and a control signal Sd for controlling the ejection motor Md. Also, the motors Ma, Mb, and Md are equipped with respective first thermostats 14 similar to the first thermostat 14 for the mold-clamping motor Mc, and the motor drive circuits 11 are equipped with respective second thermostats 15 similar to the second thermostat 15 for the mold-clamping motor Mc. The first thermostats 14 and the second thermostats 15 are connected to the control instruction unit 16.

Figure 1:
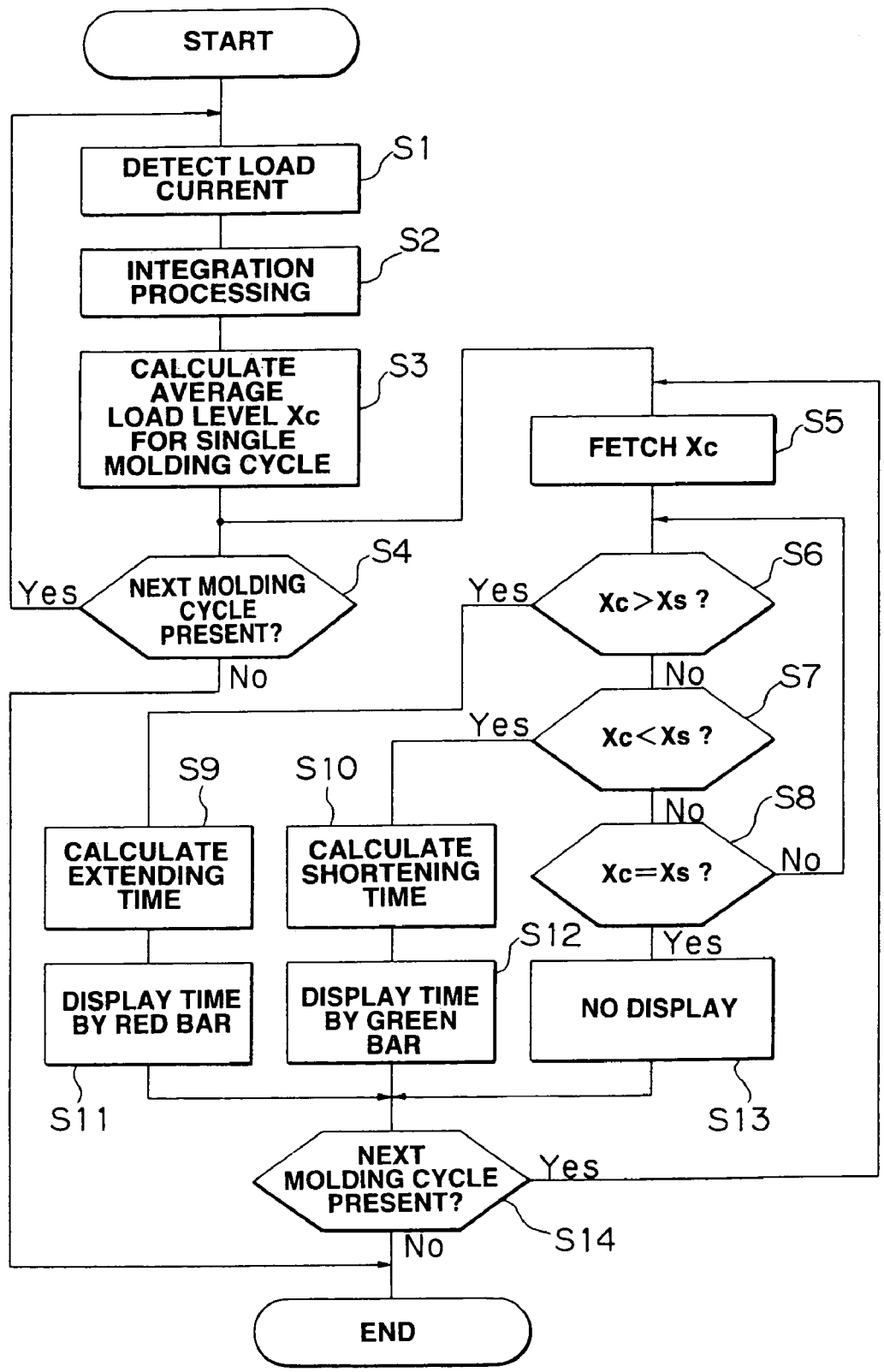
FIG. 1 is a flowchart showing the steps of a load monitoring method according to an embodiment of the present invention.
Figure 2:
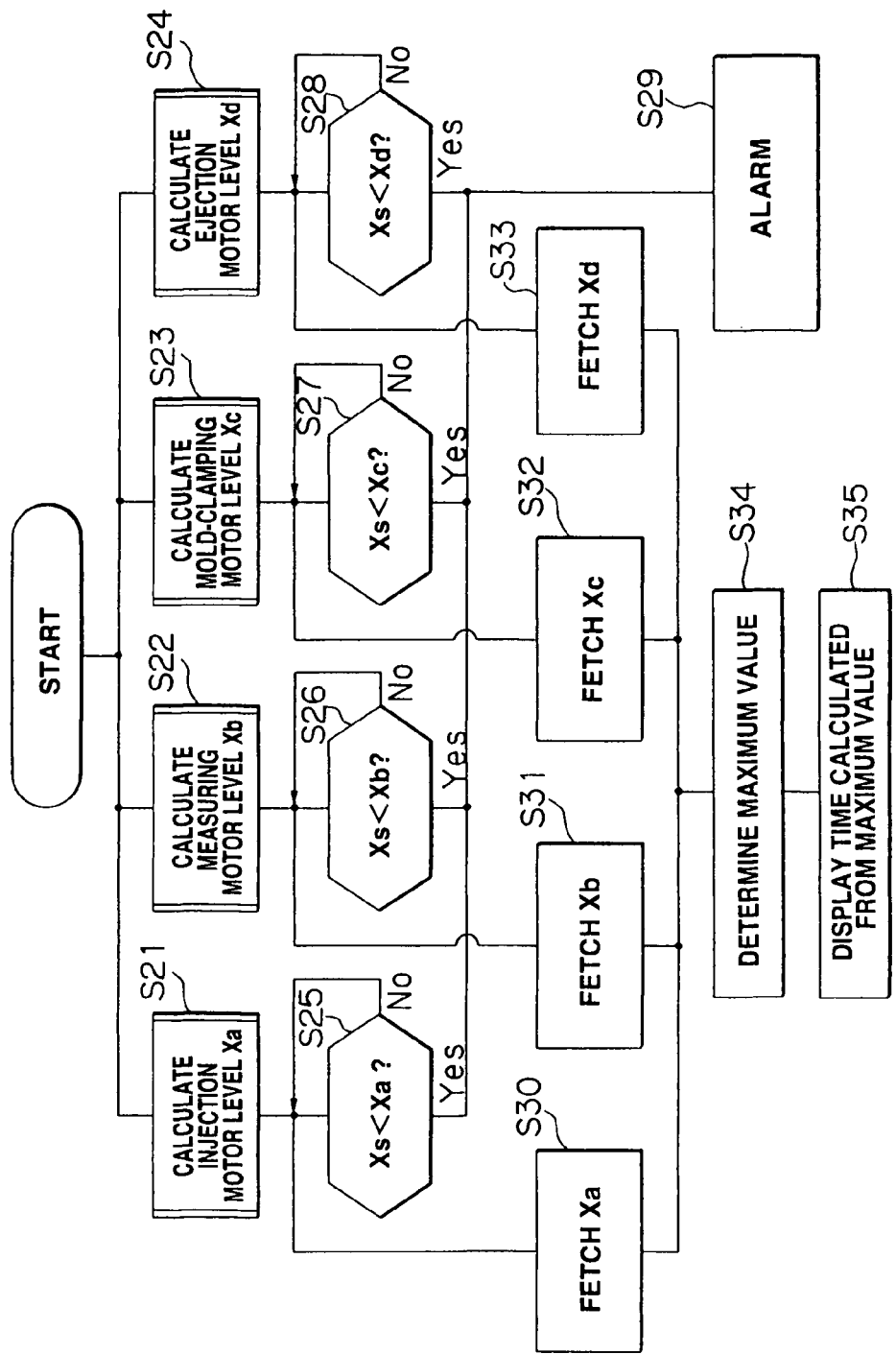
FIG. 2 is a flowchart showing the steps of the load monitoring method, focusing on processing performed for respective drive motors.

The load monitoring method of the motor-driven injection molding machine 1 according to the present embodiment will next be described in accordance with the flowcharts of FIGS. 1 and 2 and with reference to FIGS. 3 to 5.

FIG. 5 is a timing chart showing operation of the injection motor Ma, the measuring motor Mb, the mold-clamping motor Mc, and the ejection motor Md. In FIG. 5, an OFF period does not necessarily mean interruption of electric supply to the motor Ma, Mb, Mc, or Md, but may mean no-load operation of the same.

The description below assumes that a normal molding process is performed. As shown in section (c) of FIG. 5, the mold-clamping motor Mc is operated (as represented by an ON state) in a mold-clamping stage (including a mold-closing stage) and in a mold-opening stage, while the load current Ic flows to the mold-clamping motor Mc; and the mold-clamping motor Mc is stopped (as represented by an OFF state) in other stages. In an ON period during which the mold-clamping motor Mc is operated, the average load level Xc is obtained on the basis of the load current Ic flowing through the mold-clamping motor Mc.

First, the load current Ic is detected by means of the current sensor 13 (step S1). On the basis of the detected load current Ic, the average-load-level calculation unit 12 obtains the average load level Xc through calculation. That is, the square of load (load current Ic) during a single molding cycle is integrated with respect to time, and the average load level Xc is obtained from the result of integration (steps S2 and S3). Specifically, when a ratio of load current to the maximum load current at which continuous operation is possible is represented by X (%) and a period of time of a single molding cycle is represented by tm (second), the average load level Xc during a single molding cycle period can be obtained from the square root of $\{(x_1^2 \cdot t_1 + x_2^2 \cdot t_2 + x_3^2 \cdot t_3 \ldots x_n^2 \cdot t_n)/tm\} = (Pm/tm)$.

Wherein x represents a ratio of load current to a maximum load current at which continuous operation is possible, t represents time and Pm represents load level, load factor, of a single molding cycle and tm represents a period of time of a single molding cycle.

Such an average load level (average load factor) Xc is successively obtained for each molding cycle period so long as repetition of molding cycles continues (step S4). Similarly, as shown in section (a) of FIG. 5, the injection motor Ma is operated (ON) during an injection stage and during a measuring stage, and is stopped (OFF) during other stages. As shown in section (b) of FIG. 5, the measuring motor Mb is operated (ON) during the measuring stage, and is stopped (OFF) during other stages. As shown in section (d) of FIG. 5, the ejection motor Md is operated (ON) during an ejection stage, and is stopped (OFF) during other stages. As shown in FIG. 2, as in the case of the mold-clamping motor Mc described above, the average load level (average load factor) Xa of the injection motor Ma, the average load level (average load factor) Xb of the measuring motor Mb, and the average load level (average load factor) Xd of the ejection motor Md are obtained through calculations (steps S21, S22, S23, and S24).

A reference load level (reference load factor) Xs is previously set in the controller U. The reference load level Xs can be set on the basis of the above-described maximum load at which continuous operation is possible and in consideration of a predetermined margin. In the present embodiment, the reference load level Xs is set to 95%. The controller U monitors the average load levels Xa, Xb, Xc, and Xd, and when one of the average load levels Xa, Xb, Xc, and Xd exceeds the reference load level Xs, the controller U outputs an alarm so as to report this (steps S25, S26, S27, S28, S29).

Meanwhile, the average load levels Xa, Xb, Xc, and Xd are fetched by the extending/shortening time calculation unit 17 (steps S30, S31, S32, S33). The extending/shortening time calculation unit 17 determines (selects) the highest one (maximum value) among the obtained average load levels Xa, Xb, Xc, and Xd (step S34). Further, the extending/shortening time calculation unit 17 calculates a cycle extending time te or a cycle shortening time ti on the basis of the selected average load level Xa, Xb, Xc, or Xd, and feeds the calculated time te or ti to the display processing unit 18 so as to display the calculated time te or ti (step S35). Next, processing performed for the selected average load level Xa, Xb, Xc, or Xd will be described specifically. The flowchart of FIG. 1 shows the case where the average load level Xc has been selected.

First, on the basis of the selected average load level Xc, the extending/shortening time calculation unit 17 calculates a cycle extending time te or a cycle shortening time ti which is necessary for decreasing or increasing the average load level Xc to the above-descried reference load level Xs (steps S5, S6, S7, S8, S9, S10). Specifically, the extending/shortening time calculation unit 17 compares the average load level Xc with the above-described reference load level Xs. When the average load level Xc is greater than the reference load level Xs (Xc>Xs), the extending/shortening time calculation unit 17 calculates the cycle extending time te (step S6, S9). In the present embodiment, since the reference load level Xs is 95%, the cycle extending time te can be obtained from the equation te=$(Pm/Xc^2)-(Pm/Xs^2)=(Pm/Xc^2)-(Pm/0.95^2)$.

In contrast, when the average load level Xc is less than the reference load level Xs (Xc<Xs), the extending/shortening time calculation unit 17 calculates the cycle shortening time ti (step S7, S10). In the present embodiment, the cycle shortening time ti can be obtained from the equation ti=$(Pm/Xs^2)-(Pm/Xc^2)=(Pm/0.95^2)-(Pm/Xc^2)$.

Moreover, when the average load level Xc is generally equal to the reference load level Xs (95%) (Xc=Xs), this means that the drive section operates under an ideal load condition, and therefore, the extending/shortening time calculation unit 17 calculates neither the cycle extending time te nor the cycle shortening time ti (step S8).

Figure 4:
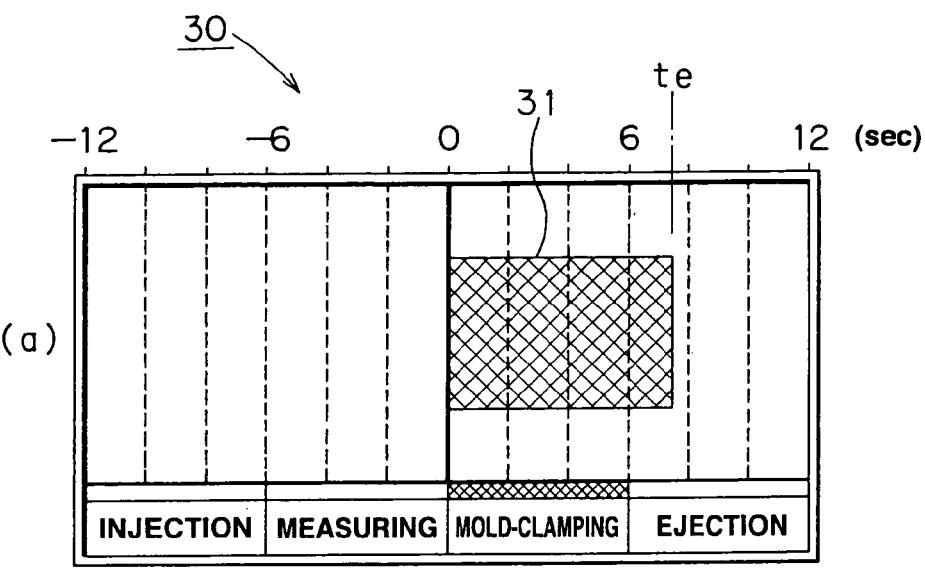
FIGS. 4(a) and 4(b) show a manner of displaying a cycle extending time and a cycle shortening time obtained by the load monitoring method.
Figure 4:
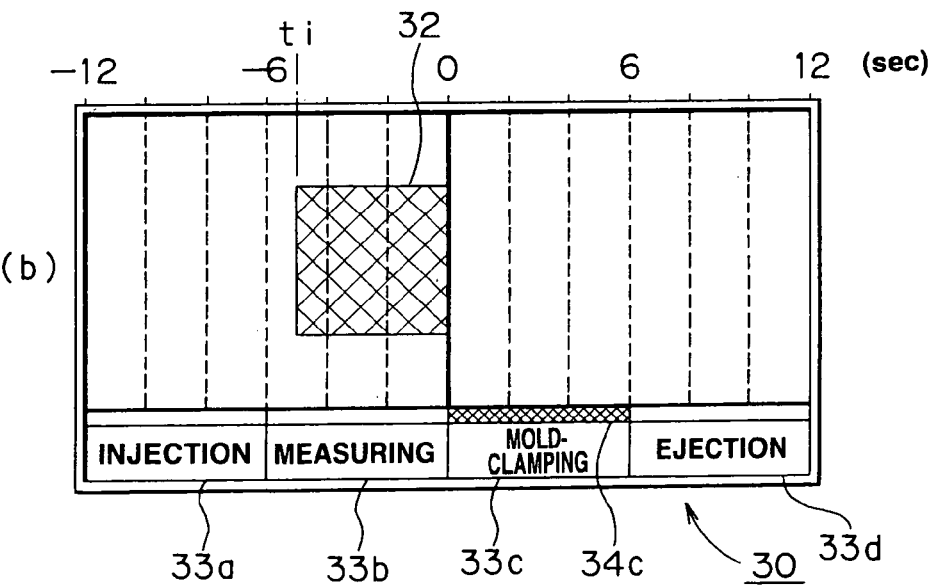

As shown in FIG. 4(*a*), the calculated cycle extending time te is displayed in the form of a red bar 31 in an extending/shortening time display section 30 of the display (step S11). As shown in FIG. 4(*b*), the calculated cycle shortening time ti is displayed in the form of a green bar 32 in the extending/shortening time display section 30 of the display (step S12). Notably, when Xc=Xs, no display is provided; i.e., neither the red bar 31 nor the green bar 32 is displayed (step S13). The extending/shortening time display section 30 is updated every time a single molding cycle is performed (step S14). This update is performed in accordance with the conditions shown in FIG. 2. Therefore, when any one of other average load levels; i.e., the average load level Xa of the injection motor Ma, the average load level Xb of the measuring motor Mb, and the average load level Xd of the ejection motor Md, has exceeded the average load level Xc of the mold-clamping motor Mc, the cycle extending time te or the cycle shortening time ti calculated on the basis of the average load level Xa, Xb, or Xd, which has exceeded the average load level Xc, is displayed. In FIGS. 4(*a*) and 4(*b*), reference numerals 33*a*, 33*b*, 33*c*, and 33*d* denote drive motor display sections for displaying a motor Ma, Mb, Mc, or Md, for which a cycle extending time te or a cycle shortening time ti is displayed. Therefore, when a cycle extending time te or a cycle shortening time ti for the mold-clamping motor Mc is displayed, an indicator 34*c* provided above the drive motor display section 33*c* labeled "mold clamping" is turned on.

Meanwhile, the operator monitors the cycle extending time te or the cycle shortening time ti, and takes a necessary measure. For example, when the cycle extending time te is displayed, the operator extends the actual cycle time on the basis of the cycle extending time te. That is, the operator changes the operation conditions in such a manner that the lengths of periods in which all the motors Ma, etc. stop, or the load levels Xc, etc. are extremely low, become longer. Specifically, the operator changes the operation conditions in such a manner that at least one of the cooling period and the mold open/close period, in which all the motors Ma, etc. stop, becomes longer. For such purpose, the controller U may be modified in such a manner that when the operator turns on a cycle time automatic setting key or a like key provided additionally, the time length of a previously set step or stage is automatically extended by the cycle extending time te. Further, when the operator determines that changing the cycle time is not preferred in consideration of the type of resin used, the operator may check other operation conditions such as pressure, velocity, and temperature, and change some operation conditions if necessary.

In contrast, when cycle shortening time ti is displayed, the operator shortens the actual cycle time on the basis of the cycle shortening time ti, and may check other operation conditions such as pressure, velocity, and temperature, and change some operation conditions if necessary.

Moreover, the first thermostats 14 and the second thermostats 15 directly monitor heat generated by the motors Ma, Mb, Mc, and Md and that from the motor drive circuits 11. Through combination of the direct monitoring of heat generation and the above-described indirect monitoring of heat generation on the basis of the average load levels Xa, Xb, Xc, and Xd obtained from the corresponding load currents Ic, dual protection is implemented. For example, indirect monitoring of heat generation on the basis of the average load levels Xa, Xb, Xc, and Xd may fail to detect an overload state when a great increase in motor temperature is caused by a change in ambient atmosphere (room temperature). Thus, when any one of the thermostats 14 and 15 outputs a signal indicative of overload, the overload stop processing is performed. In the present embodiment, setting is performed such that when the molding apparatus is used at an appropriate ambient temperature, an overload state is first detected through monitoring on the basis of the average load levels Xa, Xb, Xc, and Xd and is then detected by the thermostats 14 and 15.

According to the load monitoring method according to the present embodiment, a cycle extending time te or a cycle shortening time ti is displayed. Therefore, the operator can accurately grasp an actual load condition real time by monitoring the cycle extending time te or the cycle shortening time ti, and can quickly take a necessary measure. For example, when a cycle extending time te is displayed, the operator can extend the cooling period by extending the cycle time, to thereby avoid an unnecessary interruption of a molding process, which would otherwise occur because of overload. Further, when a cycle shortening time ti is displayed, the operator can optimize the cycle time by shortening the cycle time, to thereby eliminate wasteful time (a time loss) involved in the cycle time, whereby production efficiency and productivity can be improved. Moreover, the operator can set and maintain optimum molding conditions, while reflecting actual operating conditions therein, to thereby improve molding quality.

While the present invention has been described with reference to the preferred embodiment, the present invention is not limited thereto. Regarding structural details, numerical values, technique, among others, modifications and any omission or addition may be possible as needed without departing from the scope of the invention. For example, in the present invention, a cycle extending time te and a cycle shortening time ti are not required to have a high level of accuracy. When the cycle extending time te and the cycle shortening time ti are provided with such an accuracy that the operator can grasp a general load condition of each motor; in particular, whether the motor is on the overload side or the low load side, or a general load level, the operator can take a necessary measure on the basis of the cycle extending time te and the cycle shortening time ti. Therefore, if necessary, the cycle extending time te and the cycle shortening time ti may be displayed indirectly; for example, a degree of cycle extension or shortening may be displayed without display of units, or the average load level may be displayed as is. Moreover, no restriction is imposed on the manner of displaying the cycle extending time te and the cycle shortening time ti; they may be displayed by use of numerical values. Furthermore, the above embodiment is described while mentioning the injection motor Ma, the measuring motor Mb, the mold-clamping motor Mc, and the ejection motor Md as drive motors, but is not meant to exclude motors in other drive sections.

What is claimed is:

1. A load monitoring method for monitoring load of a drive section provided in a motor-driven injection molding machine and using a drive motor, the method comprising the steps of:
    obtaining an average load level of the drive section for each molding cycle;
    calculating a cycle extending time or a cycle shortening time which is necessary for decreasing or increasing the average load level to a previously set reference load level; and
    displaying the cycle extending time or the cycle shortening time,
    wherein the average load level for each molding cycle is obtained from the square root of $\{(x_1^2 \cdot t_1 + x_2^2 \cdot t_2 + x_3^2 \cdot t_3 \ldots x_n^2 \cdot t_n)/tm\} = (Pm/tm)$, where x represents a ratio of load current to a maximum load current at which continuous operation is possible, t represents time and Pm represents load level, load factor, of a single molding cycle and tm represents a period of time of a single molding cycle.

2. A load monitoring method according to claim 1, wherein the reference load level is set on the basis of a maximum load at which continuous operation is possible and a predetermined margin.

3. A load monitoring method according to claim 1, wherein the cycle extending time (te) is obtained from the equation $te = (Pm/Xc^2) - (Pm/Xs^2)$, where Xc represents the average load level, and Xs represents the reference load level.

4. A load monitoring method according to claim 1, wherein the cycle extending time is displayed in the form of a bar on a display.

5. A load monitoring method according to claim 1, wherein the cycle extending time is used to extend a period in which the drive section is stopped or operated with no load.

6. A load monitoring method according to claim 1, wherein the cycle shortening time (ti) is obtained from the equation $ti = (Pm/Xs^2) - (Pm/Xc^2)$, where Xc represents the average load level, and Xs represents the reference load level.

7. A load monitoring method according to claim 1, wherein the cycle shortening time is displayed in the form of a bar on a display.

8. A load monitoring method according to claim 1, wherein the cycle shortening time is used to shorten a period in which the drive section is stopped or operated with no load.

9. A load monitoring method according to claim 1, wherein the drive motor includes one or more motors selected from an injection motor, a measuring meter, a mold-clamping motor, and an ejection motor.

10. A load monitoring method according to claim 9, wherein average load levels of at least two drive motors are obtained, and the cycle extending time or the cycle shortening time is calculated on the basis of a higher one of the average load levels.

11. A load monitoring method according to claim 1, wherein when the average load level exceeds the reference load level, an alarm is provided in order to report that the average load level exceeds the reference load level.

12. The load monitoring method according to claim 1, wherein the cycle extending time is displayed in the form of a bar on a display.

13. The load monitoring method according to claim 2, wherein the cycle extending time is displayed in the form of a bar on a display.

14. The load monitoring method according to claim 3, wherein the cycle extending time is displayed in the form of a bar on a display.

15. The load monitoring method according to claim 1, wherein the cycle shortening time is displayed in the form of a bar on a display.

16. The load monitoring method according to claim 2, wherein the cycle shortening time is displayed in the form of a bar on a display.

17. The load monitoring method according to claim 3, wherein the cycle shortening time is displayed in the form of a bar on a display.

18. The load monitoring method according to claim 4, wherein the cycle shortening time is displayed in the form of a bar on a display.

19. The load monitoring method according to claim 5, wherein the cycle shortening time is displayed in the form of a bar on a display.

* * * * *